F. L. SESSIONS & F. C. COSEO.
ELECTRIC LOCOMOTIVE.
APPLICATION FILED AUG. 10, 1903.
1,027,073.
Patented May 21, 1912.
3 SHEETS—SHEET 1.
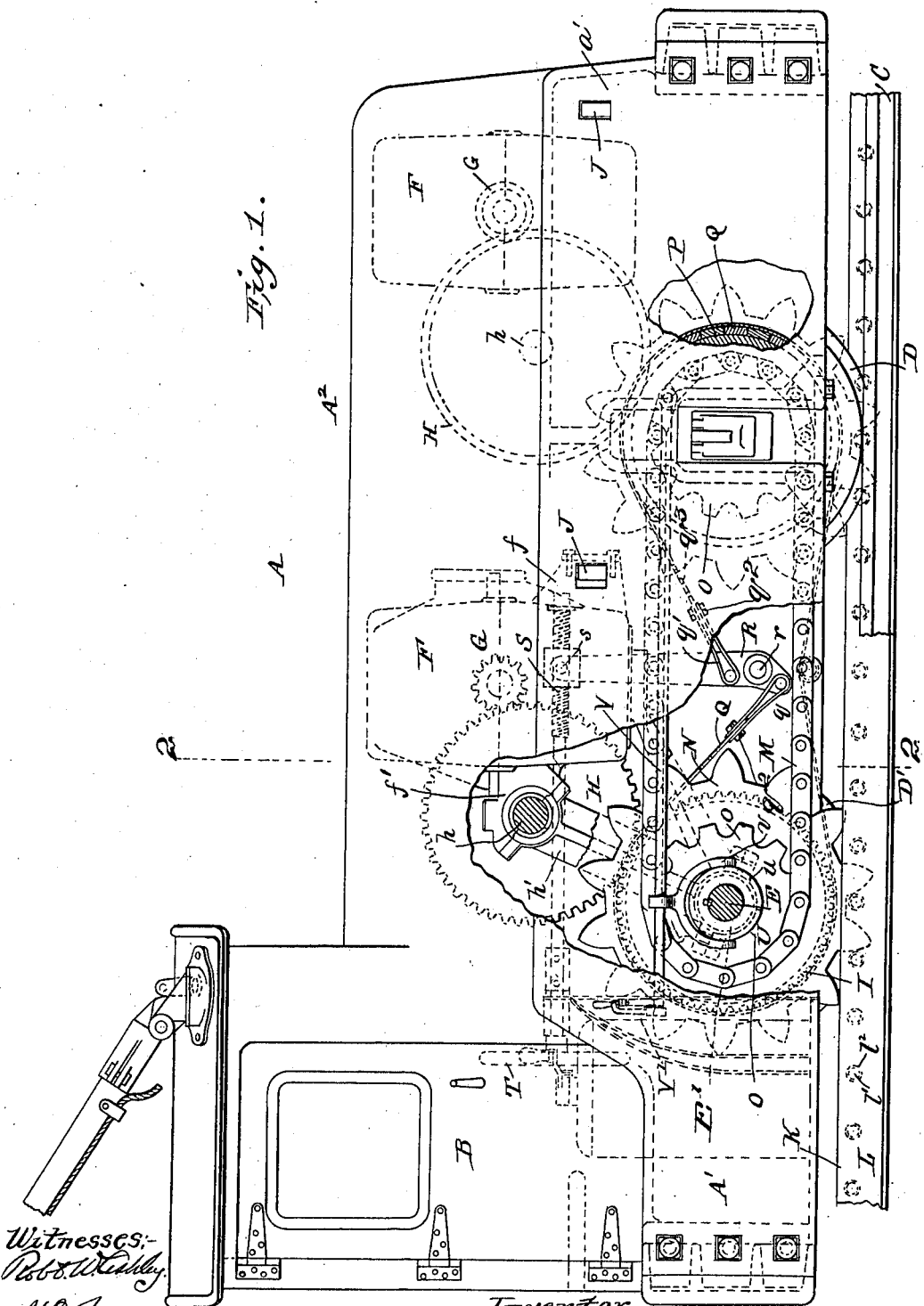

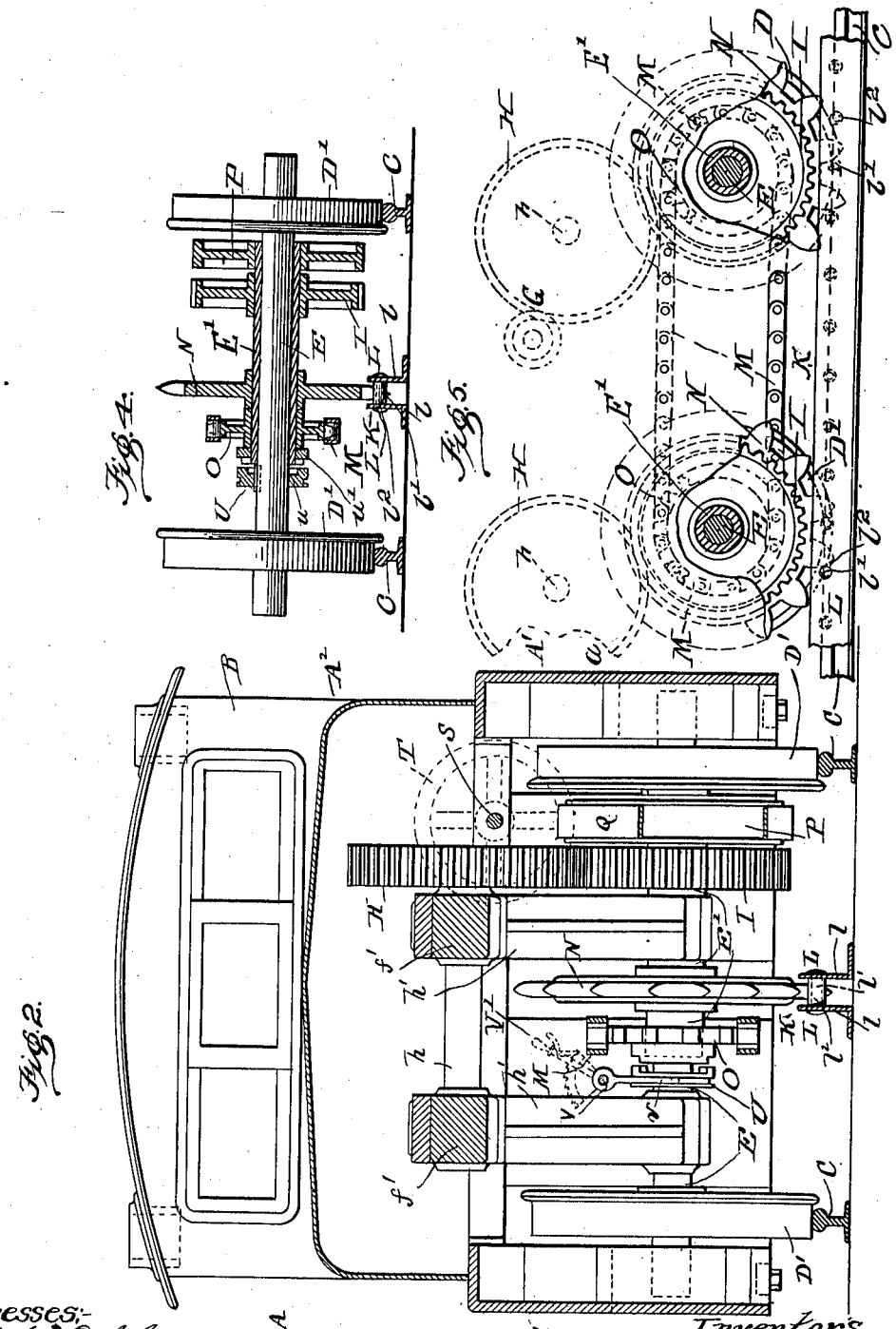

F. L. SESSIONS & F. C. COSEO.
ELECTRIC LOCOMOTIVE.
APPLICATION FILED AUG. 10, 1903.
1,027,073.
Patented May 21, 1912.
3 SHEETS—SHEET 3.
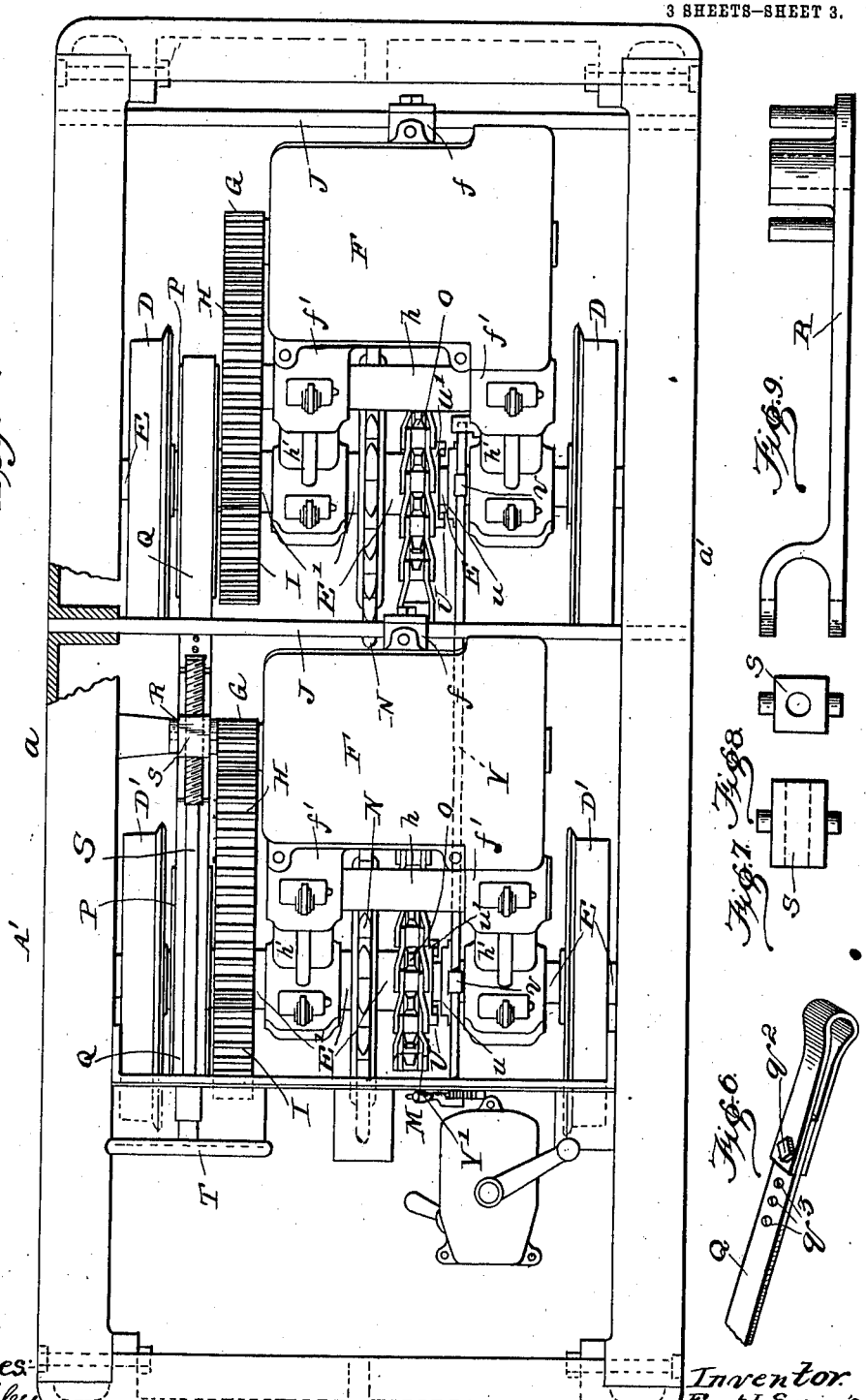

UNITED STATES PATENT OFFICE.

FRANK L. SESSIONS AND FREDERICK C. COSEO, OF COLUMBUS, OHIO, ASSIGNORS, BY MESNE ASSIGNMENTS, TO THE JEFFREY MANUFACTURING COMPANY, A CORPORATION OF OHIO.

ELECTRIC LOCOMOTIVE.

1,027,073.     Specification of Letters Patent.     Patented May 21, 1912.

Application filed August 10, 1903. Serial No. 169,033.

*To all whom it may concern:*

Be it known that we, FRANK L. SESSIONS and FREDERICK C. COSEO, citizens of the United States, residing at Columbus, in the county of Franklin and State of Ohio, have invented certain new and useful Improvements in Electric Locomotives, of which the following is a specification, reference being had therein to the accompanying drawing.

This invention relates to locomotives, and more particularly to locomotives of the class which can be used to exert tractive force, whether in the ordinary way by means of frictional engagement of the supporting wheels with a track, or by means of the engagement of one or more specially provided toothed wheels with a suitable rack laid parallel to the ordinary track rails.

The invention has as its object the provision of a locomotive of this class having improved means for controlling and actuating the toothed wheels and improved arrangement of parts whereby power can be applied to the track wheels, to the toothed wheels, or to both.

Other objects will be apparent from the following specification.

Figure 1 is a view in side elevation, parts being broken away, of an electric car embodying our improvements. Fig. 2 is a vertical cross section on the line 2—2 of Fig. 1. Fig. 3 is a plan view. Fig. 4 is a view partly in side elevation and partly in section of one of the axles and the operative parts mounted thereon. Fig. 5 is a side elevation, partly diagrammatic, of the driving mechanism detached. Figs. 6 to 9 show details.

A indicates an electric car or locomotive embodying our improvements. It is made with the lower body part A' and the upper cover part A², there being a cab or housing at B for the operator.

C C indicate the track rails to which are fitted the track wheels D D' of the locomotive. The locomotive frame as a whole is yieldably mounted on the track wheels.

F F indicate electric motors. Each of these is geared to one of the hereinafter described tubular shafts on the axles of the car, the motors being independent of each other.

We have devised a peculiar mounting for the motors and the gearing in order that we can accomplish certain important purposes. Each motor is in a relatively elevated position. The field parts constitute a box-like structure formed in separable halves, upper and lower. The lower half is cast with lugs or projections $f$ which extend forward from it. These lugs are socketed or formed with apertures for the insertion of a supporting bar J which extends across from one side part $a$ of the car body to the opposite side $a'$. The lower half of the field is also cast with bearing lugs $f'$ which rest upon and are secured to standards $h'$. The standards are at the bottom connected to one of the axles E of the locomotive. The upper half of each motor field rests upon and is secured to the lower half. Each armature shaft has a pinion G which meshes with a spur wheel H, which in turn meshes with the spur wheel I rigidly secured to a tubular shaft E' which runs freely upon one of the axles E of the locomotive.

K represents a toothed rack which is secured to the track system. It is formed of angle bars L having the vertical flanges $l$ and cross bars $l'$. The angle bars are secured to the ties which support the track rails C. Preferably, spacing tubes or thimbles $l^2$ are used with the cross bars $l'$.

The wheels N are secured to the tubular shafts E' upon the axles E. The wheels N are adapted to engage with the cross-bars or teeth of the rack. The wheels receive power from the motors through the tubular shaft E', and through the gearing which has been described. On each tubular shaft there is a chain wheel or sprocket wheel O, and that on one tubular shaft is connected to that on the other by means of the chain M. When the locomotive is moving along a section of the track adjacent to the rack system K, the teeth of the sprocket wheels N engage with the rack teeth and the locomotive is positively propelled.

The space wherein the parts can be arranged in mine locomotives is exceedingly restricted, particularly on horizontal, transverse lines. The connecting of the two axles by means of a chain or chains such as that at M prohibits the arrangement of the motors and the driving gear in the usual way; that is to say, prohibits placing them in or near the horizontal planes of the axles. In the present construction, and as above described, the motors are arranged above the horizontal planes of the driving chain M and their power is transmitted through the gearing set forth, supported upon the peculiar structure which has been described.

It is desirable to connect each of the motors to its rack wheel N independently of the other in order that the full power of each motor can be transmitted. At the same time it is desirable that the rack wheels be connected together by a train of power transmitting devices so that in the event of one motor becoming disabled the locomotive will still be operable from the other motor. If the rack wheels were not thus connected there would be a possibility of one of them becoming inoperative and useless as a traction gear. Again, as it is possible with applicants' construction to drive the axles positively from the motor by means of the clutches interposed between the axles and the loose sleeves, if the sleeves were not connected together and one of the motors became disabled but one axle would be positively driven.

While in the drawings we have shown electric motors and have hereinbefore referred particularly to electric motors as the power translating means for a locomotive of our construction, it will be understood that any well-known type of motor, such as steam or gasolene, may be used instead of an electric motor, where desired, without departing from the essential features of our invention.

Inasmuch as the motors are independently connected to their sleeves, respectively, there is danger that, when the car is to be stopped, if a braking action is applied to only one of the sleeves the other sleeve will be affected by the momentum of the parts of its motor and gearing. Hence, we apply a brake mechanism to both tubular shafts and employ one which is compensating in character.

P indicates a brake drum, there being one on each tubular shaft. Q is a flexible brake band which is placed around both of the said brake drums. Its ends are connected to a lever R which is pivoted at $r$ to the car frame. The end $q$ is connected to this lever on one side of its pivot, and the end $q'$ is connected upon the other side. The lever R is moved by means of a draw rod S passing through a nut which is pivoted at $s$, the lever extending to a point within reach of the operator. It has a hand wheel T keyed to it, so that by turning the hand wheel the threaded part of the rod operating in the pivot nut swings the lever R around its pivot, and this, in turn, causes draft to be exerted upon both ends of the friction band Q. Consequently, an equalized braking action is exerted upon both of the drums and tubular shafts or sleeves.

The clips $q$—$q'$ at the ends of the brake band are bolted to the strap or band proper, as shown at $q^2$, and the ends of the band are provided with series of apertures $q^3$. When the band becomes loose on the drums it can be readily and quickly tightened by simply removing the bolts and drawing the bands up one or more notches so as to connect it with one or the other of the clips through another of the apertures $q^3$.

Where sections of level track are met with in the track system, the rack rail may be dispensed with and the motors connected directly to the axles of the track wheels. This connection between the motors and the axles of the track wheels may be made in any suitable manner. In the drawings we have shown a positive clutch U interposed between the axles E and the loose sleeves E'. The movable jaw $u$ of the said clutch is splined to the shaft E and the other jaw $u'$ of the clutch is rigidly secured to the sleeve E'.

V is a clutch operating rod preferably extending longitudinally of the locomotive and having secured to it the shifting or fork arms $v$ which operate in the well known manner to advance the movable jaw $u$ of the clutch.

V' indicates the operating lever for the rod V and its locking rack, these parts being within the cab of the locomotive.

It will be seen that when the locomotive is on a level section of track way which is not provided with the rack rail, the clutch U may be thrown into operative engagement and the power will be transmitted from the motors F through the gears I, sleeves E' and clutches U to the axles E, and the locomotive will be propelled in the ordinary way. The arrangement of the clutch, furthermore, provides means for a very quick and effective braking of the locomotive, for this clutch may be thrown into operative engagement while the sprocket wheels are engaged with the rack, and then if the brake is applied to the drum P, not only does its braking action affect the sprockets N, but also affects the track wheels D D', in view of the fact that the axles E are then rigidly connected with the sleeves E'. It will thus be seen that when the jaws of the clutch U are in engagement and the brake is applied its effect is to simultaneously brake the sprockets N and the track wheels D—D.

It will be seen that the rack wheels and the track wheels are of the same size so that when they are directly connected together, as by the clutch that unites the axle of the track wheels with the sleeve of the rack wheel, they have the same peripheral speed.

What we claim is:

1. In an electric locomotive of the class described, the combination of the frame, the two axles, the track wheels, the toothed wheels loosely mounted on the axles adapted to engage the stationary rack, the chain connecting the toothed wheels and adapted to cause said toothed wheels to revolve simultaneously on their respective axles, the motors, and the gearing connecting the motors with the toothed wheels, substantially as set forth.

2. In an electric locomotive of the class described, the combination of the frame, the two axles, the track wheels, the toothed wheels loosely mounted on the axles adapted to engage the stationary rack, the chain connecting the toothed wheels and adapted to cause said toothed wheels to revolve simultaneously on their respective axles, the motors one or both of which are elevated above the horizontal plane of the chain, and the gearing connecting the motors with the toothed wheels, substantially as set forth.

3. In an electric locomotive of the class described, the combination of the body frame, the two axles, the track wheels on the axles, the toothed wheels loose on the axles, the flexible power transmitting devices connecting the loose wheels and adapted to cause said toothed wheels to rotate simultanously on their respective axles, the motors situated above said power transmitting devices, the framework connected to the axles and to the motors, and the shafting and gearing, other than said power transmitting devices flexibly connecting the loose wheels, interposed between the motors and the toothed wheels, substantially as set forth.

4. In an electric locomotive of the class described, the combination of the body frame, the two axles, the track wheels on the axles respectively, the sleeves on the axles respectively, the rack engaging wheels secured to the said sleeve respectively, means connecting the two sleeves together and adapted to cause said sleeves to revolve simultaneously on their respective axles, and power transmitting devices connected to one or both of the said sleeves, substantially as set forth.

5. In an electric locomotive of the class described, the combination of the body frame, the two axles, the track wheels on the axles respectively, the sleeves loosely mounted on the axles, two motors each geared to one of the said sleeves adapted to cause them to rotate simultaneously on their respective axles, means independent of the gearing between said motors and sleeves for flexibly connecting the two sleeves, and rack wheels respectively secured rigidly to the said sleeves, substantially as set forth.

6. In an electric locomotive of the class described, the combination of the axles, the frame yieldingly mounted on the axles, the rack wheels concentric with the axles and rotatable independently thereof and rising and falling therewith, power devices for driving one of the said rack wheels, and power transmitting devices arranged to flexibly connect the two rack wheels, said last mentioned power transmitting devices being separate elements as distinguished from the said axle and the said first mentioned power devices for driving one of the rack wheels, substantially as set forth.

7. In a locomotive of the class described, the combination of the two axles, the frame mounted on the axles, the rack wheels, each mounted on one of said axles, and adapted to be rotated independently thereof, a motor on the frame, a train of power transmitting devices connecting said motor with one of said axles, and means independent of said train of power transmitting devices for synchronously and simultaneously rotating said rack wheels on their respective axles.

8. In a locomotive of the class described, the combination of the axles, the frame mounted on the axles, the rack wheels, one mounted on each of said axles and adapted to be rotated independently thereof, the motors situated above said rack wheels, the shafting and gearing interposed between the motors and the rack wheels and a train of power transmitting devices independent of said axles and connecting the said rack wheels together.

9. In a locomotive of the class described, the combination of the axles, the car frame mounted on the axles, the two motors, the two propelling wheels each adapted to engage with a stationary propelling element, power transmitting devices connecting the two said propelling wheels, and the equalizing brake mechanism having brake drums, each rigidly secured to one of said propelling wheels and straps adapted to engage said drum and resist the movements of both of the propelling wheels simultaneously, substantially as set forth.

10. In an electric locomotive of the class described, the combination of the frame, the two axles, the track wheels, the rack wheels loose on said axles, the power transmitting chain connecting the rack wheels independent of said axles, the motors, and the gearing connecting the motors with the rack wheels.

11. In an electric locomotive of the class described, the combination of the frame, the two axles, the track wheels, the rack wheels loosely mounted on the axles and adapted to engage with a stationary rack, the motors, the gearing connecting the motors with the rack wheels, the plurality of brake pulleys, each rigidly secured to one of said rack wheels, and means for simultaneously resisting the movement of all of said brake pulleys.

12. In an electric locomotive of the class described, the combination of the frame, the two axles, the track wheels, the rack wheels loosely mounted on the axles and adapted to engage with a stationary rack, the motors, the gearing connecting the motors with the rack wheels, and means for simultaneously connecting the rack wheels with their respective axles.

13. In an electric locomotive of the class described, the combination of the frame, the two axles, the track wheels, the rack wheels loosely mounted on the axles and adapted to engage with a stationary rack, the power transmitting mechanism connecting the said rack wheels, the motors, the gearing connecting the motors with the rack wheels, and means for simultaneously connecting the rack wheels with their respective axles.

14. In a locomotive of the class described, the combination of the axles, the car frame mounted on the axles, the two rack wheels each adapted to engage with a stationary rack rail, and adapted to rotate independently of said axles, means for simultaneously connecting said rack wheels with and disconnecting them from said axles, and the brake mechanism adapted to resist the movement of both of said rack wheels simultaneously.

15. In an electric locomotive, the combination of the frame, the two axles, the rack wheel loose on one axle, the second rack wheel mounted in said frame, the motor, the gearing actuated by the motor for driving one of said rack wheels, and power transmitting devices for flexibly connecting said last described rack wheel to the other rack wheel independent of the motor gearing and of said axles.

16. In an electric locomotive, the combination of the frame, the axles, the track wheels on the axles, a plurality of rack wheels mounted in said frame and adapted to engage with a stationary rack, the motor, gearing actuated by the motor for driving one of said rack wheels, and power transmitting devices flexibly connecting said rack wheel with the other rack wheel independent of the motor gearing and of said axles.

17. In an electric locomotive, the combination with the truck, the front axle, the rear axle, the track wheels rigid with the axles, the rack wheel loose on the front axle, the rack wheel loose on the rear axle, the two clutches, one interposed between each axle and the rack wheel thereon, adapted to connect each of said rack wheels to its respective axle, and the power transmitting devices flexibly connecting the said rack wheels together, adapted to effect their simultaneous rotation on their axles.

18. In an electric locomotive of the class described, the combination of the frame, the axles, the track wheels on the axles, the plurality of rack wheels of the same size as the track wheels, each loosely mounted on one of said axles, the plurality of clutches interposed between said loosely mounted rack wheels and their respective axles, and means for simultaneously actuating said clutches.

19. In an electric locomotive of the class described, the combination of the frame, the motor, the front axle, the rear axle, said axles being normally disconnected from the motor, track wheels rigid with the axles, the rack wheel loose on the front axle, the rack wheel loose on the rear axle, the train of power transmitting devices interposed between the motor and one of said rack wheels, and a second train of power transmitting devices independent of the axles for flexibly connecting said rack wheels together.

20. In an electric locomotive of the class described, the combination of the frame, the motor, the axles, said axles being normally disconnected from the motor, the rack wheel mounted to rotate independently of said axles, a train of power transmitting devices interposed between said motor and said rack wheel, a second rack wheel, and a train of power transmitting devices independent of the axles for flexibly connecting said rack wheels together.

21. In an electric locomotive of the class described, the combination of the frame, the axles, the track wheels, the plurality of rack wheels adapted to rotate independently of said axles, and means for simultaneously connecting each of said rack wheels with one of said axles.

22. In an electric locomotive, the combination of the frame, the axles, the track wheels, the plurality of rack wheels mounted in said frame and adapted to rotate independently of said axles, the motors, the trains of power transmitting devices interposed between the motors and each of said rack wheels, the plurality of clutches for connecting each of said rack wheels to its adjacent axle, and means for simultaneously operating said clutches.

23. In an electric locomotive of the class described, the combination of the frame, the axles, the track wheels, the plurality of rack wheels, each mounted on one of said axles and adapted to rotate independently of it, the motors, the trains of power transmitting devices interposed between the motors and each of said rack wheels, the plurality of clutches, each interposed between one of said rack wheels and its axle, and means for simultaneously operating all of said clutches.

24. In an electric locomotive of the class described, the combination of the frame, the two axles, the track wheels, the rack wheels loosely mounted on the axles and adapted to engage with a stationary rack, the train of power transmitting devices connecting the said rack wheels, the motors, the gearing connecting the motors with the rack wheels, the plurality of clutches each interposed between one of said rack wheels and its axle, and means for actuating said clutches simultaneously.

25. In an electric locomotive, the combination of the frame, the axles, the sleeves loose upon the axles, the plurality of rack wheels, one on each sleeve, the plurality of clutches, one interposed between each sleeve and its axle, and means for operating said clutches simultaneously.

26. In an electric locomotive, the combination of the frame, the axles, the track wheels, the plurality of rack wheels mounted in said frame, the brake pulleys, one rigidly secured to each of said rack wheels, and the equalized brake mechanism adapted to resist the movement of all of said brake pulleys simultaneously.

27. In an electric locomotive, the combination of the frame, the axles, the track wheels, the plurality of rack wheels adapted to rotate independently of said axles, means for simultaneously connecting each of said rack wheels with one of said axles, the plurality of brake pulleys, one secured to each of said rack wheels, and the equalized brake mechanism adapted to resist the movement of all of said brake pulleys simultaneously.

28. In an electric locomotive of the class described, the combination of the frame, the axles, the track wheels, the sleeves loosely mounted on said axles, the plurality of rack wheels, one on each sleeve, the clutches, each interposed between one of said sleeves and its axle, the plurality of brake pulleys, each secured to one of said sleeves, and the brake mechanism adapted to resist the movement of all of said brake pulleys simultaneously.

29. In an electric rack rail locomotive, the combination of a suitable frame, supporting track wheels and axles for the frame, a sleeve loosely mounted on one of said axles, a rack wheel having its pitch diameter equal to the tread diameter of the track wheel and secured to said sleeve, a motor on the frame, power transmitting mechanism interposed between said motor and said sleeve, and a clutch interposed between said sleeve and the axle on which it is mounted.

30. In a rack rail locomotive, the combination with a suitable frame, of a locomotive propelling mechanism comprising adhesion track wheels which also support the frame, a rack wheel having its pitch diameter equal to the tread diameter of the track wheels and mounted to revolve about the axis thereof, and a clutch element interposed between said adhesion and rack wheels for connecting or disconnecting them, a motor on the frame and power transmitting mechanism interposed between the motor and the said locomotive propelling mechanism.

31. In a locomotive of the class described, the combination with a frame, axles upon which the frame is mounted, and track wheels rigidly secured to said axles, of rack wheels mounted upon said axles and capable of rotation independently thereof, a motor, gearing between said motor and one of the rack wheels, a mechanism independent of said gearing connecting said rack wheels to cause them to rotate synchronously, clutches adapted to connect each of the rack wheels with its respective axle, and braking devices one on each axle.

32. In a locomotive of the class described, the combination of two axles, track wheels secured to said axles, rack wheels rotatable relative to said track wheels, clutches between said rack wheels and said axles, brakes on each of said axles, a power transmitting device connecting the two rack wheels to cause them to rotate synchronously, two motors and suitable gearing additional to the power transmitting device between the rack wheels, connecting each motor to a rack wheel.

33. In a rack rail locomotive, the combination with a frame and axles and track wheels upon which the frame is supported, of two rack wheels rotatable independently of the track wheels, a connection between the rack wheels for insuring their rotation at the same peripheral speed, a motor, power transmitting mechanism between the motor and one of the rack wheels, the said power transmitting mechanism being independent of the connection between the two rack wheels, and means for connecting or disconnecting one of the rack wheels and one pair of track wheels.

34. In a rack rail locomotive, the combination with a suitable frame and axles and track wheels for supporting the said frame, of two rack wheels rotatable independently of the track wheels, a connection between the rack wheels for insuring their rotation at the same peripheral speed, means for operatively connecting one of the rack wheels with one pair of the track wheels, two motors, and power transmitting mechanisms independent of the connection between the rack wheels for connecting the motors with the rack wheels.

35. In a rack rail locomotive, the combination with a frame and axles and track wheels for supporting the same, of two rack wheels rotatable independently of the track wheels, a connection between the rack wheels for insuring their rotation at the same peripheral speed, mechanism for connecting or disconnecting one of the rack wheels and one pair of the track wheels, a motor, a brake, and connecting mechanism between the motor and brake and one of the rack wheels, the said connecting mechanism being independent of the connecting mechanism between the two rack wheels.

36. In a rack rail locomotive, the combination with axles, track wheels and a suitable frame supported thereby, of two rack wheels rotatable independently of the track wheels, connecting means for insuring their synchronous rotation, means for connecting or disconnecting one of the rack wheels and one pair of the track wheels, two motors, power transmitting mechanisms between the motors and the rack wheels, the said mechanism being independent of the connecting means between the rack wheels and a braking means operatively connected with one of the rack wheels.

37. In a rack rail locomotive, the combination with axles, track wheels and a suitable frame supported thereby, of two rack wheels rotatable independently of the track wheels, connecting means between the rack wheels for insuring their synchronous rotation, means for simultaneously connecting or disconnecting the rack wheels with the track wheels, a motor, a brake, and connecting mechanism between the motor and brake and one of the rack wheels, the said mechanism being independent of the connecting means between the two rack wheels.

38. In a rack rail locomotive, the combination with axles, track wheels and a suitable frame supported thereby, of two rack wheels rotatable independently of the track wheels, a connection between the rack wheels for insuring their synchronous rotation, means for simultaneously connecting the rack wheels with the track wheels, two motors, power transmitting mechanism for connecting the motors with the rack wheels, the said mechanisms being independent of the connection between the two rack wheels, and a braking device operatively connected with one of the rack wheels.

39. The combination with axles, track wheels and a suitable frame supported thereby, of two rack wheels, a connection between them insuring rotation at the same peripheral speed, means for connecting or disconnecting one of the rack wheels and one pair of the track wheels, a brake, and a connection between the brake and one of the rack wheels, the said connection being independent of the connection between the two rack wheels.

40. The combination with axles, track wheels and a frame supported thereby, of two rack wheels rotatable independently of the track wheels, a connection between the rack wheels for insuring rotation at the same peripheral speed, means for simultaneously connecting the two rack wheels with the track wheels, and a brake connected to one of the rack wheels independently of the connection between the two rack wheels.

41. The combination with axles, track wheels and a suitable frame supported thereby, of two rack wheels rotatable independently of the track wheels, a connection between them for insuring synchronous rotation, means for connecting or disconnecting one rack wheel and one pair of track wheels, and two brake devices which operatively connect with a rack wheel independently of the connection between the two rack wheels.

42. In a rack rail locomotive, the combination with axles, track wheels and a suitable frame supported thereby, of two rack wheels rotatable independently of the track wheels, a connection between them for insuring their synchronous rotation, a device for connecting or disconnecting one rack wheel and one pair of track wheels, two brakes each operatively connected to a rack wheel independently of the connection between the two rack wheels, a motor, and power transmitting means between the motor and one of the rack wheels, the said means being independent of the connection between the two rack wheels.

43. The combination with axles, track wheels and a suitable frame supported thereby, of two rack wheels rotatable independently of the track wheels, a connection between the rack wheels for insuring their synchronous rotation, means for simultaneously connecting the two rack wheels with the track wheels, and two brakes each operatively connected with a rack wheel independently of the connection between the two rack wheels.

44. In a rack rail locomotive, the combination with axles, track wheels and a suitable frame supported thereby, of two rack wheels rotatable independently of the track wheels, a connection between them for insuring synchronous rotation, means for simultaneously connecting or disconnecting the rack wheels and the track wheels, two brakes each operatively connected with a rack wheel independently of the connection between the two rack wheels, a motor, and a power transmitting means between the motor and one rack wheel, the said means being independent of the connection between the two rack wheels.

45. In a rack rail locomotive, the combination with axles, track wheels and a suitable frame supported thereby, of two rack wheels rotatable independently of the track wheels, a connection between them for insuring synchronous rotation, means for connecting one of the rack wheels with one pair of track wheels, a motor and brake connected with one rack wheel, and a second motor and brake connected with the other rack wheel, the connections between the said motors and brakes and the rack wheels being independent of the connections between the two rack wheels.

46. In a rack rail locomotive, the combination with axles, track wheels and a suitable frame supported thereby, of two rack wheels rotatable independently of the track wheels, a connection between the rack wheels for insuring synchronous rotation, means for simultaneously connecting the two rack wheels with the track wheels, two motors, power transmitting mechanisms between the motors and the rack wheels, the said mechanisms being independent of the connection between the two rack wheels, and a brake operatively connected with one of the rack wheels independently of the connection between the two rack wheels.

47. In a rack rail locomotive, the combination with axles, track wheels and a suitable frame supported thereby, of two rack wheels, a connection between them to insure synchronous rotation, a motor connected to one rack wheel independently of the connection between the two rack wheels, and a brake connected to one rack wheel independently of the connection between the two rack wheels.

48. In a rack rail locomotive, the combination with axles, track wheels and a suitable frame supported thereby, of two rack wheels, a connection between them for insuring synchronous rotation, two motors, power transmitting mechanisms between the motors and rack wheels, the said mechanisms being independent of the connection between the two rack wheels, and a brake connected to one of the rack wheels independently of the connection between the two rack wheels.

49. The combination with axles, track wheels and a suitable frame supported thereby, of two rack wheels, a connection between them to insure rotation at the same peripheral speed, and a brake connected to one of the rack wheels independently of the connection between the two rack wheels.

50. In a rack rail locomotive, the combination with axles, track wheels and a frame supported thereby, of two rack wheels, a connection between them to insure rotation at the same peripheral speed, a motor connected to one rack wheel independently of the connection between the two rack wheels, and a brake connected to one rack wheel independently of the connection between the two rack wheels.

51. In a rack rail locomotive, the combination with axles, track wheels and a frame supported thereby, of two rack wheels, a connection between them to insure rotation at the same peripheral speed, a motor, power transmitting mechanism between the motor and one of the rack wheels, the said mechanisms being independent of the connection between the two rack wheels, and two brakes each operatively connected to a rack wheel independently of the connection between the two rack wheels.

In testimony whereof we affix our signatures in presence of two witnesses.

FRANK L. SESSIONS.
FRED. C. COSEO.

Witnesses:
WALTER J. BAUROTH,
CHAS. McCONKEY.